United States Patent [19]

Kinnanen

[11] Patent Number: 5,636,894
[45] Date of Patent: Jun. 10, 1997

[54] LOCKING ARRANGEMENT FOR THE OPENABLE TOP OF AN OPEN AUTOMOBILE

[76] Inventor: Matti Kinnanen, P.O. Box 4, Uusikaupunki, Finland

[21] Appl. No.: 371,836

[22] Filed: Jan. 12, 1995

[30] Foreign Application Priority Data

Jan. 26, 1994 [FI] Finland .................. 940397

[51] Int. Cl.$^6$ .................. B60J 7/00
[52] U.S. Cl. .................. 296/107; 296/121; 292/DIG. 5
[58] Field of Search .................. 296/107, 121, 296/224; 292/DIG. 5

[56] References Cited

U.S. PATENT DOCUMENTS

| | | | |
|---|---|---|---|
| 3,425,742 | 2/1969 | Rauber, Jr. | 296/121 |
| 3,584,912 | 6/1971 | Leger | 296/121 X |
| 4,618,180 | 10/1986 | Muscat | 296/107 X |
| 4,819,983 | 4/1989 | Alexander et al. | 296/121 |
| 4,830,425 | 5/1989 | Muscat | 296/107 |
| 5,042,869 | 8/1991 | Brin . | |
| 5,064,241 | 11/1991 | Ohrle | 296/121 |
| 5,186,516 | 2/1993 | Alexander et al. | 296/121 |
| 5,286,077 | 2/1994 | Kinnanen | 296/107 |
| 5,435,615 | 7/1995 | Schmitz | 296/121 |
| 5,499,855 | 3/1996 | Andres et al. | 296/121 |

FOREIGN PATENT DOCUMENTS

92/15466  9/1992  WIPO .

Primary Examiner—Joseph D. Pape
Attorney, Agent, or Firm—Merchant, Gould, Smith, Edell, Welter & Schmidt, P.A.

[57] ABSTRACT

A locking arrangement for the openable top of an open automobile, in an open automobile provided with a multiple-articulated roof mechanism (1), by which the car top can be moved with the aid of an actuator into opened, respectively closed, position, and in which to the foremost, or first, rib (2) on the free end of the car top has been connected a first locking member (3) and on the windshield beam (4) has been provided a second locking member (5), said locking members in mutual cooperation locking the car top to the windshield beam when the car top is in closed position. The roof mechanism (1) has been arranged to guide the motion path of the first rib (2) on the free end of the car top at the terminal stage of the closing motion in the vicinity of the windshield beam (4) to be substantially longitudinal to the vehicle or at a small angle somewhat downward inclined from the horizontal plane, and the locking members (3 and 5) are disposed to become interlocked so that exclusively said terminal motion of the roof mechanism causes automatic interlocking of the first locking member (3) with the second locking member (5) on the windshield beam.

12 Claims, 2 Drawing Sheets

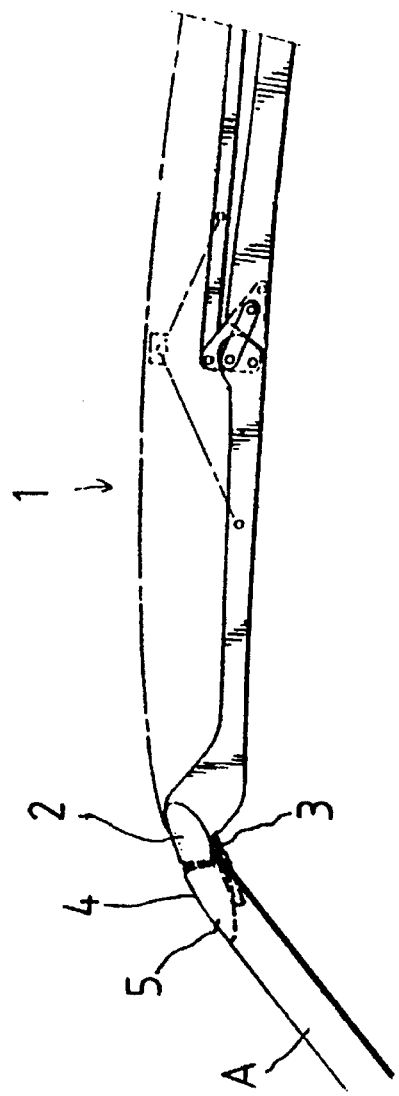
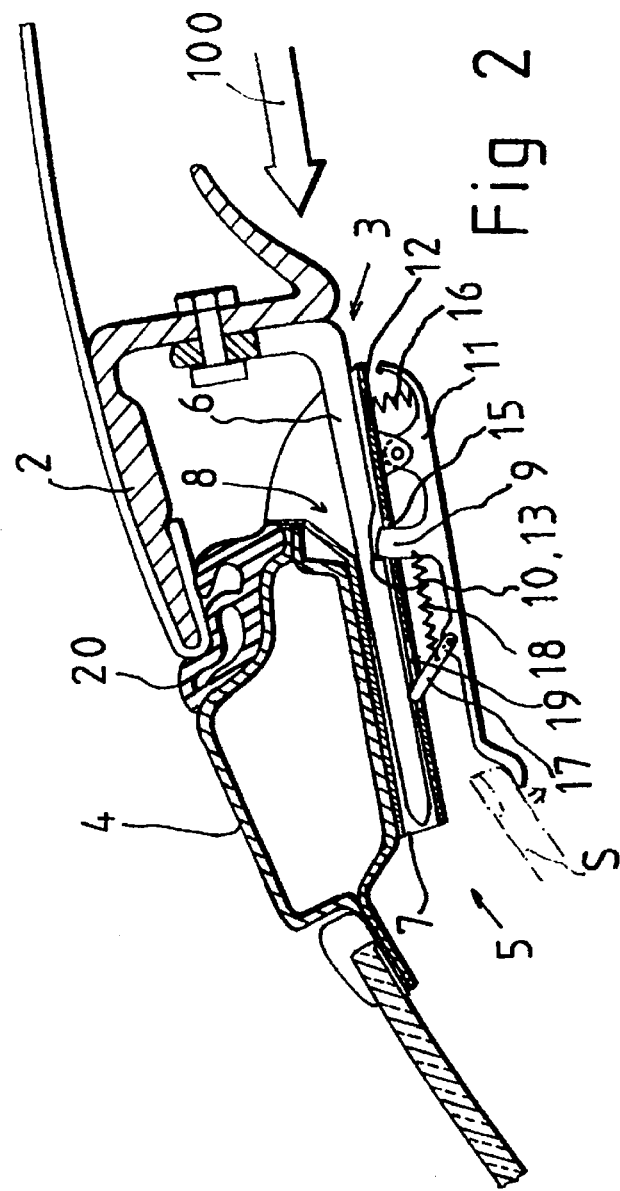

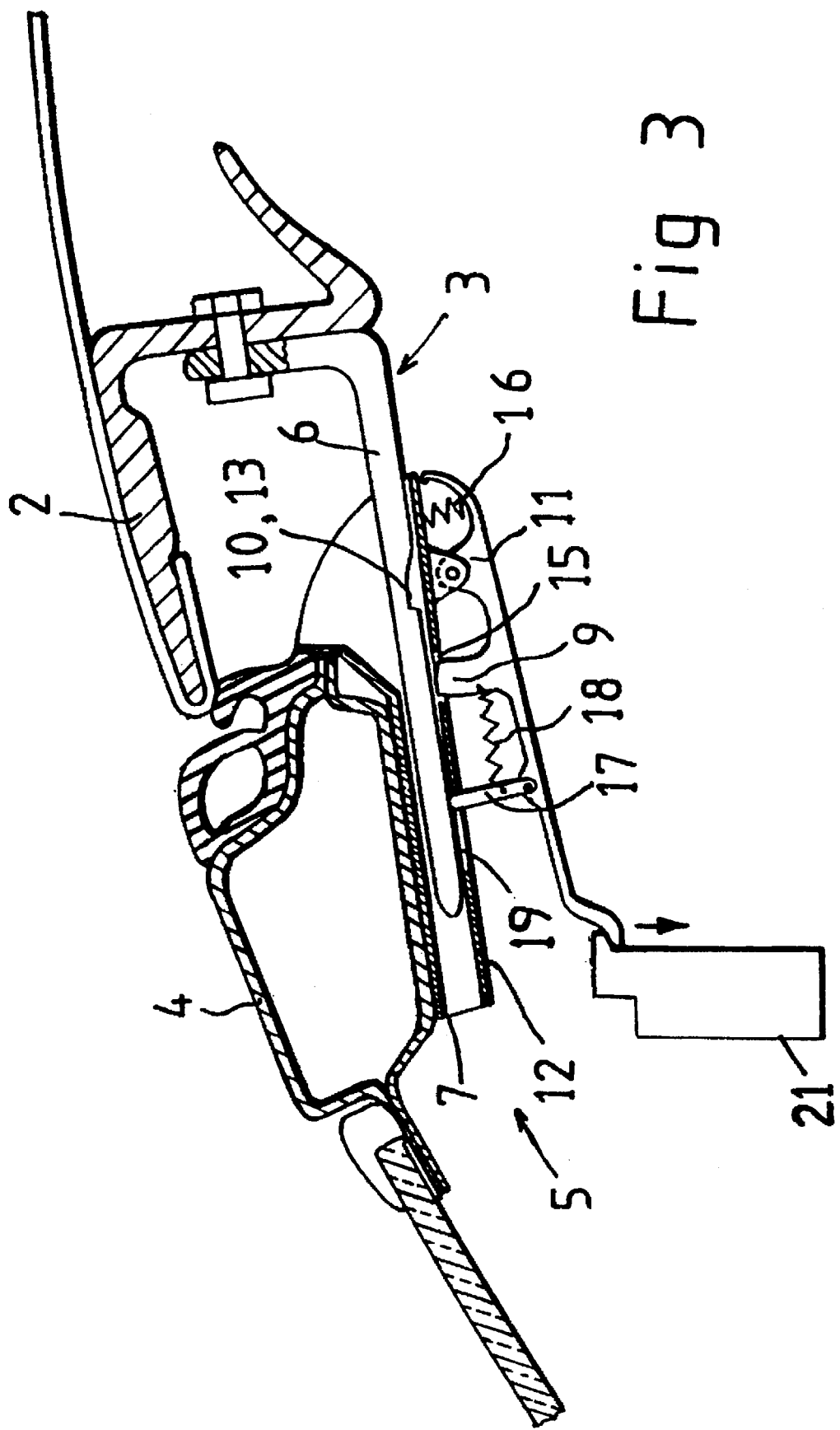

LOCKING ARRANGEMENT FOR THE OPENABLE TOP OF AN OPEN AUTOMOBILE

The present invention concerns a locking arrangement as defined in the preamble to claim 1.

In the state of art is known a locking arrangement for the openable top of an open automobile, in an open automobile provided with a multiple articulated, actuator-operated roof mechanism comprising a plurality of elements consecutively hinged to be turnable in relation to each other. It is possible with this roof mechanism to move the covering consisting of resilient material, such as fabric, with the aid of the actuator means between an open position, in which the covering and the roof mechanism are located outside the passenger compartment in folded-up configuration, and a closed position, in which the covering and the roof mechanism are located upon the passenger compartment in extended configuration. In said arrangement to the foremost rib on the free end of the top, or the first rib, has been connected a first locking member and on the windshield beam has been provided a second locking member. These locking members in cooperation lock the top to the windshield beam when the top is in its closed position. The windshield beam is a component of the car body, being a beam transversal to the car and which connects with each other the windshield side posts, or the so-called A posts, at the top margin of the windshield. Together with the A posts, the windshield beam encircles the windshield when the windshield is mounted in the frame constituted by the A posts and the windshield beam.

A trend followed in the development of open automobiles is to make manipulation of the top as convenient as possible. Therefore, one has attempted in prior art to facilitate the interlocking of the foremost top rib with the windshield beam in that the locking members are placed in their locking position after the foremost rib has first been made to rest against the windshield beam, whereafter the locking hooks, locking slides or equivalent members on the windshield beam can be operated by means of a separate electrohydraulic or electric actuator over various force transmission mechanisms, which are located either on the windshield beam or on the first rib of the top. With conventional roof mechanisms a motion path of the first rib of the top is achieved which descends onto the windshield beam from above or at a comparatively steep angle obliquely from above. Such locking arrangements are known, for instance, through the references WO 92/15466 and U.S. Pat. No. 5,042,869.

The problem associated with locking arrangements of prior art is that they indispensably require actuators and force transmission mechanisms to accomplish interlocking, whereby the construction is rendered remarkably complex, involving added weight and costs.

The object of the invention is to eliminate the drawbacks mentioned.

The specific object of the invention is to disclose a locking arrangement of novel type which enables automation of the top locking and opening in a maximally advantageous way and with a minimum of components.

A further object of the invention is to disclose a locking arrangement which enables tightly sealed, safe and noiseless locking of an automated car top to the windshield beam in such manner that its rearward and lateral movement is completely inhibited. The concept of noiselessness is in this context understood to mean that any creaking and squeaking arising from torsion of the body is eliminated.

The locking arrangement of the invention is characterized by that which is stated in claim 1.

As taught by the invention, the roof mechanism is arranged to guide the motion path of the first rib on the free end of the car top at the final stage of the closing movement in the vicinity of the windshield beam to be substantially longitudinal to the vehicle or at a small angle somewhat downward inclined from the horizontal plane, and the locking members have been disposed to interlock with each other in such manner that exclusively said terminal motion of the roof mechanism causes automatic interlocking of the first locking member of the top with the second locking member on the windshield beam.

The advantage inherent in the invention is that as the closing motion serves as driving power for the locking process, i.e., as it pushes the locking components into locking position and into locked state, no particular mechanical, electrical or muscle-operated actuators nor any force transmission members are required in the locking arrangement to achieve locking, that is, the locking is automated. The direction of the locking motion, or of the terminal movement of the first rib, may advantageously parallel the A posts. An advantageous path of motion of the first rib of the roof mechanism and perfect control of the terminal motion without any uncontrolled slamming phenomenon can be implemented, for instance, by means of the advantageous roof kinematics according to the roof mechanism presented in the Finnish Patent 89571 by the same Applicant (said disclosure being here included by reference). When the top is secured to the windshield beam by means of locking members, a safe, tight-sealing and noiseless roof locking is achieved. In turnover situations, for instance, it is indispensable that there is a secure mechanical locking between the car top and the windshield beam. Thanks to the advantageous terminal movement of the car top, optimum sealing is also achieved, because a packing functions best when being compressed by a perpendicular movement. When locked by means of mechanical locking members on the first rib and on the windshield beam, the junction between car top and windshield beam produces no noise due to torsion of the body because in closed position the car top is immovable relative to the windshield beam.

The other favourable embodiments and features of the invention are readable in the appended dependent claims.

In the following the invention is described in detail, referring to the attached drawing, wherein FIG. 1 presents the forward part of an open automobile's roof mechanism which is locked to the windshield beam by means of an embodiment of the locking arrangement of the invention;

FIG. 2 presents, sectioned longitudinally to the car, the locking arrangement of the roof mechanism of FIG. 1, the windshield beam and the foremost car top rib being shown as interlocked with each other;

FIG. 3 presents the embodiment of FIG. 2 with the car top being in the process of opening.

In FIG. 1 is seen the forward portion of the multiple-articulated roof mechanism 1 of an open automobile, by which the car top can be moved with the aid of an actuator into opened, respectively closed, position. To the foremost, or first, rib 2 on the free end of the car top has been connected a first locking member 3, and on the windshield beam 4 has been provided a second locking member 5. The locking members 3 and 5 lock the car top to the windshield beam 4 when the top is in closed position.

The roof mechanism 1 guides the motion path of the first rib 2 on the free end of the car top in the terminal stage of the closing motion in the vicinity of the windshield beam 4 to be substantially longitudinal to the vehicle or at a small angle slightly downward inclined from the horizontal plane, in this instance approximately parallelling the A posts, as the arrow 100 indicates in FIG. 2. The locking members 3 and 5 are disposed to interlock with each other so that exclusively the terminal motion of the roof mechanism in abovesaid direction will cause automatic locking of the first locking member 3 on the car top with the second locking member 5 on the windshield beam.

FIG. 2 shows that a packing 20 has been attached to the windshield beam 4, the forward edge of the first car top rib 2 being urged thereagainst when the car top is in closed position.

As can be seen in FIG. 2, the first locking member 3 comprises an elongated tongue 6, which parallels the terminal motion 100. The tongue 6 is fixedly attached to the first rib 2. This tongue 6 is L-shaped and by its flange attached with bolt joint to the first rib 2.

The second locking member 5 comprises a throat member 7 with an elongated throat or passage, directed to parallel the above-mentioned terminal motion 100. The elongated passage of the throat member 7 has been disposed to receive the tongue 6 in itself. The shapes of the tongue 6 and throat member 7 are so selected that they guide and center the car top to be properly positioned relative to the windshield beam 4. The inside surface of the passage wall 12 parallels the terminal motion 100 and serves as sliding surface against the underside of the tongue 6, so that the tongue can slide along the inside surface of the wall 12. The throat member 7 also comprises a funnel-shaped mouth part 8 widening outward and primarily upward, for guiding the tongue 6.

The second locking member 5 further comprises a detent member 9, and the tongue 6 comprises a mating member 10, the detent member 9 being placeable in interlocking contact therewith. The detent member 9 is in this case a locking peg which has been formed on a locking lever 11. The locking lever 11 is turnably pivoted to the wall 12 of the throat member 7. The mating member 10 is a shoulder-like depression 13 in the underside of the tongue, the detent member 9 being introducible therein through an aperture 15 in the wall 12. In locking position, the retaining surface the locking peg 9 becomes hooked in the depression 13, preventing retraction of the tongue 6. A spring 16 has been disposed between the locking lever 11 and the wail 12 to urge the locking lever 11 and the locking peg 9 thereto connected continuously towards the locking position. The locking peg 9 comprises, in addition to the retaining surface, a bevelled surface meeting the bevelled surface of the free end of the tongue 6 when the tongue 6 is being pushed into the throat member 7, the bevelled surface of the tongue 6 pressing the locking peg downward and the tongue thus being admitted past the locking peg 9.

The second locking member 5 further comprises a retainer member 17, the functioning of this member being illustrated by FIG. 3, which depicts the car top opening step after the locking peg 9 has been released from contact with the depression 13 and the roof mechanism has been moved in the opening direction, which is the direction opposed to the locking direction 100 in FIG. 2. The retainer member 17 has been pivoted to the locking lever 11 and arranged to keep the detent member 9, i.e., the locking peg, out of contact with the tongue 6, against the force of the spring 16. This takes place in that a spring 18 pulls the retainer lever 17 so that when the locking lever 11 has been opened with a finger S or with a power means (not depicted), the retainer member 11 rests against the underside of the tongue 6, thus preventing the locking peg 9 from reentering the depression 13 at this stage, the beginning of opening the top. In the wall 12 another aperture 19 has been provided, through which the retainer member 17 is in contact with the tongue 6.

The locking arrangement depicted in FIGS. 2 and 3 is manually releasable, while its opening may also be automated with greatest ease by implementing the liberation of the detent member 9 from the mating member 10 by means of an appropriate mechanical, electrical, hydraulic or other actuator 21. The mechanical actuator may for instance comprise a cable-mediated force transmission arrangement which transmits the force required for undoing the locking from the operating mechanism of the car top protection cover (which when the car top is open protects the top which has been folded up behind the rear seats). Control of this actuator may be combined with the control of the roof mechanism so that when the person operating the car top depresses the top actuating switch in order to open the car top, the control energizes the motor driving the pump of the car top hydraulics only after the actuator has released the car top locking. In that case the opening, closing and locking of the car top can be controlled with one single switch, and the person operating it need not manually touch the locking members on the car top rib nor those on the windshield beam.

The invention is not delimited to concern exclusively the embodiment examples presented in the foregoing: numerous modifications can be contemplated while keeping within the scope of the inventive idea defined by the claims.

I claim:

1. A locking arrangement for an openable top of an open automobile, the openable top being movable into open and closed positions by an actuator and the automobile having a windshield with a windshield beam, the locking arrangement comprising:

a multiply-articulated roof mechanism attached to the automobile, the roof mechanism having a first rib with a free end and operable so as to guide the free end in a direction having a component substantially longitudinal to the automobile at a terminal stage of a closing motion;

a first locking member on the free end of the first rib;

a second locking member on the windshield beam, the first and second locking members adapted to automatically interlock at the terminal stage of the closing motion of the first rib so as to prevent motion of the free end in a direction opposite to the closing motion.

2. A locking arrangement for an openable top of an open automobile having a multiply-articulated roof mechanism with a first rib with a free end, the roof mechanism guiding the free end in a direction having a component substantially longitudinal to the automobile at a terminal stage of a closing motion, the locking arrangement comprising:

a first locking member on the free end of the first rib;

a second locking member on the windshield beam, the first and second locking members adapted to automatically interlock at the terminal stage of the closing motion of the first rib so as to prevent motion of the free end in a direction opposite to the closing motion.

3. Locking arrangement according to claim 1, wherein the first locking member comprises a tongue fixedly connected to the first rib of the car top; and the second locking member comprises a throat member disposed to receive the tongue therein.

4. Locking arrangement according to claim 3, wherein the tongue and throat member each are shaped so as to guide and center the car top into proper position relative to the windshield beam.

5. Locking arrangement according to claim 4, wherein the throat member comprises a funnel-shaped outward widening mouth part for guiding the tongue.

6. Locking arrangement according to claim 3, wherein the second locking member comprises a detent member; and the tongue comprises a mating member adapted for lockable contact with the detent member.

7. Locking arrangement according to claim 6, wherein the second locking member comprises a locking lever turnably pivoted on a wall of the throat member (7), and the detent member is formed on said locking lever; and the mating member is a depression adapted to receive the detent member so as to maintain the tongue stationary in the throat of the throat member by mutual hooking contact of said detent member and depression.

8. Locking arrangement according to claim 7, wherein the wall includes a first aperture and the detent member contactable with the depression of the tongue through the first aperture.

9. Locking arrangement according to claim 7, wherein the second locking member comprises a first spring for turning the locking lever toward a locking position for urging the detent member into the depression.

10. Locking arrangement according to claim 9, wherein the second locking member comprises a retainer member pivotally attached to the locking lever and connected to the detent member by a second spring and adapted to keep the detent member out of contact with the tongue against a force of the first spring.

11. Locking arrangement according to claim 10, wherein the wall includes a second aperture, the retainer member contactable with the tongue through the second adapter.

12. Locking arrangement according to claim 1, further comprising a lock actuator to release the second locking member so as to disengage the first and second locking members when the operable top is opened.

* * * * *